United States Patent
Zhao et al.

(10) Patent No.: US 10,329,648 B2
(45) Date of Patent: *Jun. 25, 2019

(54) METHOD FOR MANUFACTURING SUPERIOR 13CR THICKENED DRILLROD

(71) Applicant: BAOSHAN IRON & STEEL CO., LTD., Shanghai (CN)

(72) Inventors: Peng Zhao, Shanghai (CN); Yanpeng Song, Shanghai (CN); Jianwei Zhang, Shanghai (CN); Minghua Wang, Shanghai (CN); Chunxia Zhang, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 506 days.

This patent is subject to a terminal disclaimer.

(21) Appl. No.: 14/783,139

(22) PCT Filed: Nov. 12, 2013

(86) PCT No.: PCT/CN2013/086911
§ 371 (c)(1),
(2) Date: Oct. 8, 2015

(87) PCT Pub. No.: WO2014/166252
PCT Pub. Date: Oct. 16, 2014

(65) Prior Publication Data
US 2016/0047019 A1    Feb. 18, 2016

(30) Foreign Application Priority Data
Apr. 8, 2013    (CN) .......................... 2013 1 0119899

(51) Int. Cl.
| | | |
|---|---|---|
| C22C 38/00 | (2006.01) |
| C22C 38/44 | (2006.01) |
| B21J 5/08 | (2006.01) |
| C22C 38/02 | (2006.01) |
| C22C 38/04 | (2006.01) |
| C21D 6/00 | (2006.01) |
| C21D 9/14 | (2006.01) |
| F16L 9/02 | (2006.01) |
| E21B 17/00 | (2006.01) |
| C21D 8/10 | (2006.01) |
| C21D 9/08 | (2006.01) |

(52) U.S. Cl.
CPC ................ *C22C 38/44* (2013.01); *B21J 5/08* (2013.01); *C21D 6/004* (2013.01); *C21D 6/005* (2013.01); *C21D 6/008* (2013.01); *C21D 8/105* (2013.01); *C21D 9/08* (2013.01); *C21D 9/14* (2013.01); *C22C 38/02* (2013.01); *C22C 38/04* (2013.01); *E21B 17/00* (2013.01); *F16L 9/02* (2013.01)

(58) Field of Classification Search
CPC . B21J 5/08; C21D 6/004; C21D 6/005; C21D 6/008; C21D 8/105; C21D 9/08; C21D 9/14; C22C 38/02; C22C 38/04; C22C 38/44; E21B 17/00
See application file for complete search history.

(56) References Cited

U.S. PATENT DOCUMENTS

| | | | |
|---|---|---|---|
| 9,988,857 B2* | 6/2018 | Zhao ...................... | B23K 20/12 |
| 2007/0246136 A1* | 10/2007 | Mori ....................... | C21D 6/002 |
| | | | 148/592 |
| 2014/0041770 A1* | 2/2014 | Hashizume ........... | C22C 38/001 |
| | | | 148/609 |

FOREIGN PATENT DOCUMENTS

| | | |
|---|---|---|
| CN | 1887473 A | 1/2007 |
| CN | 101117683 A | 2/2008 |
| CN | 102071363 A | 5/2011 |
| JP | S62230955 A | 10/1987 |

OTHER PUBLICATIONS

PCT International Search Report, PCT/CN2013/086911, dated Feb. 20, 2014, 6 pages.

* cited by examiner

*Primary Examiner* — Veronica F Faison
(74) *Attorney, Agent, or Firm* — Quarles & Brady LLP

(57) ABSTRACT

A method for manufacturing a superior 13Cr thickened drillrod comprises the following steps: firstly, thickening the ends of a steel tube with a composition so as to obtain a drillrod with thickened ends, the composition in percentage by weight being: C: 0.01-0.05%, Si≤0.5%, Mn: 0.2-1.0%, Cr: 12-14%, Mo: 1-3%, Ni: 4-6%, and a balance of Fe and inevitable impurities; after heating the tube as a whole to 950-1000° C., air cooling same and tempering same at 600-650° C.; and machining the two thickened ends respectively into an externally threaded drillrod coupler and an internally threaded drillrod coupler; wherein the tube end thickening is an external thickening, including three rounds of heating and three rounds of thickening, with at least one pass of deformation for each round, and the heating temperature being 1150-1200° C. for each round; and the upsetting pressure for the first round of external thickening is 180-220 bars, the upsetting pressure for the second round of external thickening is 180-220 bars, and the upsetting pressure for the third round of external thickening is 140-180 bars. The drillrod according to the present invention can be used not only as a drillrod but also as an oil tube, fulfilling requirements of the exploration operation of a $CO_2$-containing gas field of compact sandstone with a high yield.

7 Claims, No Drawings

METHOD FOR MANUFACTURING SUPERIOR 13CR THICKENED DRILLROD

CROSS-REFERENCE TO RELATED APPLICATIONS

This application represents the national stage entry of PCT International Application No. PCT/CN2013/086911 filed Nov. 12, 2013, which claims priority of Chinese Patent Application No. 201310119899.4 filed Apr. 8, 2013, the disclosures of which are incorporated by reference here in their entirety for all purposes.

FIELD OF THE INVENTION

The present invention relates to the field of drillrod manufacturing, and in particular relates to a method for manufacturing a superior 13Cr thickened drillrod.

BACKGROUND ART

Drillrods for use in oil and natural gas exploration are manufactured according to the API SPEC 5DP standards. The structure thereof has an externally threaded drillrod coupler and an internally threaded drillrod coupler which are respectively frictionally butt-welded at the two ends of the drillrod tube body. Drillrods in compliance with the API SPEC 5DP standards are of a low alloy steel material.

With the development of the oil industry, the conditions in which drillrods operate become more and more severe, drillrods of the low alloy steel material as per the API SPEC 5DP standards now fail to fulfill the increasingly harsh requirements of well drilling operation, and there exists an urgent need for a high alloy drillrod. Therefore, manufacturers abroad have developed aluminum alloy drillrods and titanium alloy drillrods.

The aluminum alloy drillrods are manufactured as per the ISO 15546 standards. The aluminum alloy drillrod is formed from an aluminum alloy drillrod tube body connected by means of fine threads with an externally threaded coupler made of low alloy steel and an internally threaded coupler made of low alloy steel.

The structure of the titanium alloy drillrod is similar to that of the aluminum alloy drillrod. U.S. Pat. No. 6,305,723 proposes a method for connecting the titanium alloy drillrod coupler, which is also carried out by connecting the titanium alloy drillrod tube body by means of fine threads with an externally threaded coupler made of low alloy steel and an internally threaded coupler made of low alloy steel.

The utilization of the aluminum alloy drillrod and the titanium alloy drillrod has two major objectives as follows: one is to drill a super deep well by taking advantage of the low specific gravity property of the aluminum alloy drillrod and the titanium alloy drillrod, and the other is to drill a sulfur-containing well by taking advantage of the resistance property of the aluminum alloy drillrod and the titanium alloy drillrod to stress corrosion by sulfides.

However, for some $CO_2$-containing gas fields whose stratum is of compact sandstone, in the case of a conventional method of operation which employs a drillrod for drilling a well and an oil tube for completing the well (i.e. a method in which a drillrod is used in a well-drilling liquid to drill the well, and after finishing the well drilling, the drillrod is lifted out, and an oil tube is lowered therein for completing the well), due to the contamination of the well-drilling liquid to the storage layer, the yield is only tens of thousands of cubic meters/day; in addition, due to a relatively high level of $CO_2$, superior 13Cr high alloy oil tube products that are costly must be used, resulting in an extremely high cost, meaning low value in industrial exploration. If a nitrogen well-drilling process can be employed, there is no contamination of the well-drilling liquid to the storage layer during well drilling, and a high yield of millions of cubic meters of natural gas per day can be achieved. However, when the nitrogen well-drilling process is used, the drillrod cannot be lifted out to exchange into the oil tube for well completion (because a well blowout will occur if the drillrod is lifted out in nitrogen, which may further lead to a tragic event with the well destroyed and peopled killed, if the drillrod is required to be lifted out, the nitrogen has to be exchanged into a well-drilling liquid), otherwise the production layer would be contaminated, lowering the yield back to tens of thousands of cubic meters/day and losing the positive effects of the nitrogen well-drilling.

SUMMARY OF THE INVENTION

An object of the present invention is to provide a method for manufacturing a superior 13Cr thickened drillrod, which is not only used as a drillrod in an earlier stage of nitrogen well-drilling operation, but also used as an oil tube in a later stage of well completion with oil tube, so as to fulfill the requirements of the exploration operation of a $CO_2$-containing gas field of compact sandstone with a high yield.

To achieve the above-mentioned object, a technical solution of the present invention is as follows:

a method for manufacturing a superior 13Cr thickened drillrod according to the present invention, comprising the following steps: firstly thickening the ends of a steel tube with a composition so as to obtain a drillrod with thickened ends, the composition in percentage by weight being: C: 0.01-0.05%, Si: ≤0.5%, Mn: 0.2-1.0%, Cr: 12-14%, Mo: 1-3%, Ni: 4-6%, and a balance of Fe and inevitable impurities; after heating the tube as a whole to a temperature of 950-1000° C., air cooling same and finally tempering same at 600-650° C., with the drillrod tube body and the thickened ends achieving a mechanic feature of 110 ksi; after the heating treatment of the drillrod, machining the two thickened ends respectively into an externally threaded drillrod coupler and an internally threaded drillrod coupler; wherein, the thickening of the tube ends is an external thickening, including three rounds of heating and three rounds of thickening, with at least one pass of deformation for each round, and the heating temperature being 1150-1200° C. for each round; and the upsetting pressure for the first round of external thickening is 180-220 bars, the upsetting pressure for the second round of external thickening is 180-220 bars, and the upsetting pressure for the third round of external thickening is 140-180 bars.

The thickening temperature for all of the previously existing low alloy drillrods is 1150-1250° C., while the thickening temperature for the superior 13Cr drillrod according to the present invention is 1150-1200° C. Such a relatively low thickening temperature and a relatively narrow temperature range are used in that the superior 13Cr material, as a high alloy steel, has a high resistance to deformation, thus a thickening temperature above 1150° C. must be used; however, a temperature exceeding 1200° C. will lead to the formation of high temperature ferrites, degrading the performance of the steel.

Since the superior 13Cr material, as a high alloy steel, has a high resistance to deformation, in particular in the case of a large amount of deformation by directly thickening the tool coupler, a relatively large upsetting pressure is generally used; at the same time, the previous thickening progresses all include an internal thickening step, and the thickening temperature cannot be increased greatly due to the high temperature ferrites, such that the increase in high temperature plasticity is limited; hence, during internal thickening, the thickened ends of the steel tube may easily be jammed against the punch head, such that when the punch head is withdrawn, the tube may be easily pulled to break. On the contrary, if a smaller upsetting pressure is used, the requirement on the thickened dimension of the tool coupler may not be fulfilled due to the high resistance of the superior 13Cr material to deformation. This is why the previous high alloy drillrods cannot be thickened. In the present invention, a high upsetting pressure and external thickening are combined inventively, so that the task of thickening, with a large amount of deformation, a tool coupler for a superior 13Cr high alloy drillrod is accomplished.

Before the present invention, all of the high alloy drillrods, including aluminum alloy drillrods and titanium alloy drillrods, are formed by connecting steel couplers with an aluminum alloy or titanium alloy tube body by means of fine threads. There are two problems with this connection method: firstly, when use as a drillrod, the strength of the connection by means of fine threads is low, such that the drillrod is easily broken at the connection; and secondly, when use as an oil tube, there are galvanic corrosions between the steel couplers and the aluminum alloy or titanium alloy tube body, easily causing severe corrosions at the steel couplers.

The previous high alloy drillrods all use a connection method by means of fine threads in that, due to the high resistance of the high alloy material to deformation, it is difficult to deform same with a conventional thickening process, and further is impossible to achieve such a large amount of thickening deformation of the tool coupler.

The present invention produces a coupler for the first time by a new process combining a low heating temperature, a high upsetting pressure and external thickening, overcoming the drawback of the fine threaded connection for the previous high alloy drillrods. When use as a drillrod, there is no fine threaded connection as the couplers and the tube body are actually the same tube, and thus a breakage will not occur at the fine threaded connection; and when use as an oil tube, as the couplers and the tube body are actually the same tube, of completely identical materials, there is no galvanic corrosion and there is no severe corrosion at the couplers.

The beneficial effects of the present invention are as follows:

By external thickening the tube ends and machining the thickened ends respectively into an externally threaded drillrod coupler and an internally threaded drillrod coupler, the present invention enables a superior 13Cr high alloy drillrod obtained to be used not only as a drillrod in an earlier stage of nitrogen well-drilling operation, but also as an oil tube in a later stage of well completion with oil tube, so as to fulfill the requirements of the exploration operation of a $CO_2$-containing gas field of compact sandstone with a high yield.

DETAILED DESCRIPTION OF THE INVENTION

The present invention will be further described in conjunction with embodiments.

The chemical compositions of the embodiments according to the present invention are shown in table 1, with a balance of Fe.

A drillrod of Φ101.6 mm was selected for tube end thickening at a thickening temperature of 1150-1200° C., with the upsetting pressure in a first external thickening step being 200 bars, the upsetting pressure in a second external thickening step being 200 bars, and the upsetting pressure in a third external thickening step being 160 bars, so as to obtain a drillrod with thickened ends, which, after being, as a whole, heated to a temperature of 950-1000° C., was air cooled, and finally tempered at 600-650° C., with the drillrod tube body and the thickened ends achieving a mechanic feature of 110 ksi; after the heat treatment of the drillrod, the two thickened ends were respectively machined into an externally threaded drillrod coupler and an internally threaded drillrod coupler.

The mechanic properties after the heat treatment are shown in table 2. It can be seen from table 2 that through the process according to the present invention, the products may achieve a mechanic feature of 110 ksi.

TABLE 1

Chemical compositions of the embodiments (wt %)

| Type of Steel | C | Si | Mn | Cr | Mo | Ni |
|---|---|---|---|---|---|---|
| Embodiment 1 | 0.04 | 0.24 | 0.35 | 12.2 | 1.9 | 5.8 |
| Embodiment 2 | 0.03 | 0.32 | 0.52 | 12.9 | 2.8 | 4.1 |
| Embodiment 3 | 0.02 | 0.36 | 0.95 | 13.8 | 1.2 | 5.2 |

TABLE 2

Mechanic properties of the embodiments

| Type of Steel | Overall heating temperature, ° C. | Tempering temperature, ° C. | Yield strength, MPa | Tensile strength, MPa |
|---|---|---|---|---|
| Embodiment 1 | 980 | 640 | 830 | 955 |
| Embodiment 2 | 970 | 630 | 870 | 980 |
| Embodiment 3 | 960 | 620 | 925 | 990 |

The superior 13Cr high alloy drillrod manufactured according to the present invention can be used not only as a drillrod in an earlier stage of nitrogen well-drilling operation, but also as an oil tube in a later stage of well completion with oil tube, so as to fulfill the requirements of the exploration operation of a $CO_2$-containing gas field of compact sandstone with a high yield.

The invention claimed is:

1. A method for manufacturing a superior 13Cr thickened drillrod according to the present invention, comprising the following steps: firstly thickening the ends of a steel tube with a composition so as to obtain a drillrod with thickened ends, the composition in percentage by weight consisting of: C: 0.01-0.05%, Si: 0.5%, Mn: 0.2-1.0%, Cr: 12-14%, Mo: 1-3%, Ni: 4-6%, and a balance of Fe and inevitable impurities; after heating the tube as a whole to a temperature of 950-1000° C., air cooling same and finally tempering same at 600-650° C., with the drillrod tube body and the thickened ends achieving a mechanic feature of 110 ksi; after the heating treatment of the drillrod, machining the two thickened ends respectively into an externally threaded drillrod coupler and an internally threaded drillrod coupler; wherein, the thickening of the tube ends is an external thickening, including three rounds of heating and three rounds of thickening, with at least one pass of deformation for each round, and the heating temperature being 1150-1200° C. for each round; and the upsetting pressure for the first round of external thickening is 180-220 bars, the upsetting pressure for the second round of external thickening is 180-220 bars, and the upsetting pressure for the third round of external thickening is 140-180 bars.

2. The method for manufacturing a superior 13Cr thickened drillrod as claimed in claim 1, wherein the temperature to which the tube as whole is heated is 960-990° C.

3. The method for manufacturing a superior 13Cr thickened drillrod as claimed in claim 1, wherein the tempering temperature is 610-640° C.

4. The method for manufacturing a superior 13Cr thickened drillrod as claimed in claim 1, wherein the heating temperature for each round is 1160-1190° C.

5. The method for manufacturing a superior 13Cr thickened drillrod as claimed in claim 1, wherein the upsetting pressure for the first round of external thickening is 190-210 bars.

6. The method for manufacturing a superior 13Cr thickened drillrod as claimed in claim 1, wherein the upsetting pressure for the second round of external thickening is 190-210 bars.

7. The method for manufacturing a superior 13Cr thickened drillrod as claimed in claim 1, wherein the upsetting pressure for the third round of external thickening is 150-170 bars.

* * * * *